(12) United States Patent
Colby et al.

(10) Patent No.: US 8,826,952 B2
(45) Date of Patent: Sep. 9, 2014

(54) RETREAD TIRE HAVING TREAD BAND MATCHED TO BASE TREAD

(75) Inventors: E. Bruce Colby, Greenville, SC (US); Nathan J. Panning, Simpsonville, SC (US)

(73) Assignees: Michelin Recherche et Technique S.A., Granges-Paccot (CH); Compagnie Generale des Etablissments Michelin, Clermont-Ferrand (FR)

( * ) Notice: Subject to any disclaimer, the term of this patent is extended or adjusted under 35 U.S.C. 154(b) by 0 days.

(21) Appl. No.: 13/381,006

(22) PCT Filed: Jun. 30, 2009

(86) PCT No.: PCT/US2009/049235
§ 371 (c)(1),
(2), (4) Date: Dec. 27, 2011

(87) PCT Pub. No.: WO2011/002448
PCT Pub. Date: Jan. 6, 2011

(65) Prior Publication Data
US 2012/0097300 A1    Apr. 26, 2012

(51) Int. Cl.
*B60C 11/02* (2006.01)
*B29D 30/56* (2006.01)

(52) U.S. Cl.
CPC ............... *B29D 30/56* (2013.01); *B60C 11/02* (2013.01)
USPC ......................................... 152/209.6; 156/96

(58) Field of Classification Search
CPC ....................................................... B60C 11/02
USPC ...................... 152/209.6, 209.19, 176; 156/96

IPC ........................................................ B60C 11/02
See application file for complete search history.

(56) References Cited

U.S. PATENT DOCUMENTS 2,609,026 A    9/1952   Luchsinger-Caballero
3,783,924 A    1/1974   Pelletier
(Continued)

FOREIGN PATENT DOCUMENTS

AU    00236346    *   6/1959
CN    1286661 A        3/2001
(Continued)

OTHER PUBLICATIONS

Partial Translation: JP2003-104010; Kobayashi; (No date).*
(Continued)

*Primary Examiner* — Steven D Maki
*Assistant Examiner* — Kendra Shin
(74) *Attorney, Agent, or Firm* — Hahn Loeser & Parks, LLP

(57) ABSTRACT

A retread tire and methods for its manufacture, the retread tire having a precured tread band bonded to a prepared bonding surface of a base portion of the tire. The precured tread band includes a back face bonded to the prepared bonding surface of the base portion of the tire and a tread groove bottom portion that extends below the back face of the tread band. The tread groove bottom portion may optionally include a void portion of the tread groove and may include the bottom wall of the tread groove and/or just the side walls of the bottom portion of the tread groove. Also included may be a base groove formed in the base portion of the tire and open to the prepared bonding surface of the tire, wherein the tread groove bottom of the tread groove is embedded within the base groove.

15 Claims, 3 Drawing Sheets

(56) References Cited

U.S. PATENT DOCUMENTS

| | | | |
|---|---|---|---|
| 3,884,740 A | 5/1975 | Schelkmann | |
| 3,895,985 A | 7/1975 | Schelkmann | |
| 3,935,045 A | 1/1976 | Wolfe | |
| 3,963,066 A | 6/1976 | Schwartz et al. | |
| 4,185,056 A | 1/1980 | Detwiler | |
| 4,196,764 A | 4/1980 | Skidmore | |
| 4,276,103 A | 6/1981 | Wolfe | |
| 5,275,218 A | 1/1994 | Nakayama et al. | |
| 5,307,854 A | 5/1994 | Brewer | |
| 5,445,691 A * | 8/1995 | Nakayama et al. | 152/209.6 |
| 5,603,366 A | 2/1997 | Nakayama et al. | |
| 6,253,815 B1 | 7/2001 | Kemp et al. | |
| 6,264,779 B1 | 7/2001 | Cappelli et al. | |
| 7,128,794 B2 | 10/2006 | Veas | |
| 7,252,728 B2 | 8/2007 | Weydert et al. | |
| 2002/0005256 A1 | 1/2002 | Fischer | |
| 2002/0040755 A1 | 4/2002 | Chamoy | |
| 2003/0211186 A1 | 11/2003 | Chamoy | |
| 2004/0007300 A1 | 1/2004 | Foucher | |
| 2004/0256057 A1 | 12/2004 | Gridley et al. | |
| 2006/0118223 A1 | 6/2006 | Maeda | |
| 2007/0144641 A1 | 6/2007 | Nguyen et al. | |
| 2008/0023116 A1 | 1/2008 | Mayni et al. | |

FOREIGN PATENT DOCUMENTS

| | | | |
|---|---|---|---|
| CN | 1721174 A | 1/2006 | |
| DE | 946956 C | 8/1956 | |
| EP | 0097787 A2 | 1/1984 | |
| EP | 0335694 A2 | 10/1989 | |
| EP | 0730950 A3 | 4/1997 | |
| EP | 0858875 A1 | 8/1998 | |
| EP | 1800843 A2 | 6/2007 | |
| EP | 2028024 A1 | 2/2009 | |
| GB | 695562 A | 8/1953 | |
| GB | 746375 A | 3/1956 | |
| GB | 1552841 A | 9/1979 | |
| GB | 2061837 A | 5/1981 | |
| JP | 59070554 A | 4/1984 | |
| JP | 01317807 A | 12/1989 | |
| JP | 02-293107 | 4/1990 | |
| JP | 03-096407 | 4/1991 | |
| JP | H05-155202 | 6/1993 | |
| JP | 05229034 A | 9/1993 | |
| JP | 09239864 A | 9/1997 | |
| JP | 2003-104010 | 4/2003 | |
| JP | 2005-193853 | 7/2005 | |
| JP | 2005-199762 | 7/2005 | |
| JP | 2005-313764 | 11/2005 | |
| JP | 2007-045354 | 2/2007 | |
| JP | 2007-172674 | 7/2007 | |
| JP | 2007261093 A | 10/2007 | |
| JP | 2007-331597 | 12/2007 | |
| JP | 2008-192689 A | 8/2008 | |
| JP | 2009-002767 | 1/2009 | |
| RU | 2165357 C2 | 4/2001 | |
| WO | 2007145150 A1 | 12/2007 | |
| WO | 2008054387 A1 | 5/2008 | |
| WO | 2008066527 A1 | 6/2008 | |
| WO | WO 2008066527 A1 * | 6/2008 | B60C 11/12 |
| WO | 2009/072633 | 6/2009 | |
| WO | 2009072633 A1 | 6/2009 | |

OTHER PUBLICATIONS

Machine Translation: JP2003-104010; Kobayashi; (No date).*

Machine Translation (from Espacenet): JP2003-104010; Kobayashi; (No date).*

PCT/US2009/049235 International Search Report and Written Opinion dated Aug. 27, 2009, 8 pgs.

English Abstract and Machine Translation of WO 2007/145150 A1 obtained from http://www.wipo.int/patentscope on Dec. 22, 2011, 7 pgs.

* cited by examiner

RETREAD TIRE HAVING TREAD BAND MATCHED TO BASE TREAD

This application is a National Stage application of International Application No. PCT/US2009/049235, filed Jun. 30, 2009, to which this application claims priority and the benefit of, the disclosure of which is also hereby incorporated by reference.

BACKGROUND OF THE INVENTION

1. Field of the Invention

The invention relates generally to retread tires and more specifically, to retread tires having tread bands matched to the prepared base tread.

2. Description of the Related Art

When tires become worn, they can be restored with new tread. Large truck tires and bus tires, for example, are typically retreaded as part of a routine tire-management program. The carcass of these types of tires is expected to last several hundred thousand miles and be amenable to having a new tread adhered to it several times. Such tires are quite expensive and are therefore bought with the expectation that their high initial costs are offset by the long service life of the carcass and the low comparative cost of retreading. Indeed, the economics included in the selection and purchase of such tires often dictate that the original tires be capable of being retreaded as many as three or four times or more.

A variety of procedures and different types of equipment are available for use in recapping or retreading pneumatic tires. One of the first steps in retreading a worn tire is to remove remaining tread material from the tire carcass, for example, by a procedure known as buffing. Next a layer of green (uncured) rubber, known as "cushion gum," may be applied to the carcass. This layer of uncured rubber may be extruded directly onto or rolled (stitched) onto the carcass. Next, a tread band is applied atop the layer of cushion gum.

In the cold recapping process, the tread band is cured rubber, and has a tread pattern already impressed in its outer and/or inner surface. Such precured bands, as the term is used herein, refer to tread bands that have been cured either fully or to some lesser extent but have undergone to some extent a curing process. The tire is then placed in an autoclave, and heated under pressure for an appropriate time to induce curing of the gum layer, and bonding of the gum layer to the tread and the carcass.

In the hot recapping process, the tread is uncured rubber and typically may have no or very little tread pattern when initially placed on the tire carcass. The tire with the uncured tread is placed in a tire mold and heated under pressure for an appropriate time to cure the gum layer and the tread, to mold the tread with the desired tread pattern, and to cause the gum layer to bond with the tread and the carcass. The term "cure" refers to the formation of cross-links between the elastomer molecules in the rubber compound, otherwise known as vulcanization.

Buffing the old tread off of the tire in preparation of the retreading process removes rubber that is discarded as waste. Much of this waste rubber that is removed in preparation of retreading is typically replaced during the retreading process as part of the undertread portion of the tread band that is bonded to the carcass during retreading. It would be advantageous if the amount of rubber that is discarded can be reduced.

SUMMARY OF THE INVENTION

Particular embodiments of the present invention include retreaded tires and methods of their manufacture. Such embodiments include a retreaded tire having a precured tread band bonded to a prepared bonding surface of a base portion of the tire. The precured tread band includes a back face bonded to the prepared bonding surface of the base portion of the tire and a tread groove bottom portion that extends below the back face of the tread band. The tread groove bottom portion may optionally include a void portion of the tread groove. In particular embodiments the tread groove bottom may include the bottom wall of the tread groove and/or just the side walls of the bottom portion of the tread groove.

The retread tire may further include a base groove formed in the base portion of the tire and open to the prepared bonding surface of the tire, wherein the tread groove bottom of the tread groove is embedded within the base groove. Some embodiments may include a top of the tread groove that is open to a ground contacting front face of the tread band.

Other embodiments include methods for retreading a tire. Such methods may include providing a prepared bonding surface of a base portion of the tire, the prepared bonding surface having a base groove formed in the base portion of the tire and open to the prepared bonding surface and providing a precured tread band comprising a back face and a tread groove bottom portion that extends below the back face. Also included may be aligning the tread groove bottom of the tread groove with the base groove and embedding the tread groove bottom portion of the tread groove within the base groove.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Particular embodiments of the present invention provide retreaded tires having precured tread bands bonded to prepared bonding surfaces of the tires. Also included are methods for producing such retreaded tires. Advantageously the tread bands bonded to the tires during the retreading process and disclosed herein may be thinner and/or less massive for a given useable tread depth, at least for some embodiments, than those used in the prior art and therefore use less material without a resulting loss of expected tread life. The tread bands disclosed herein can be thinner and/or less massive because the retreading process does not remove or replace as much of the old material from the tire to be retreaded as has typically been removed in the prior art processes.

Figure 1:
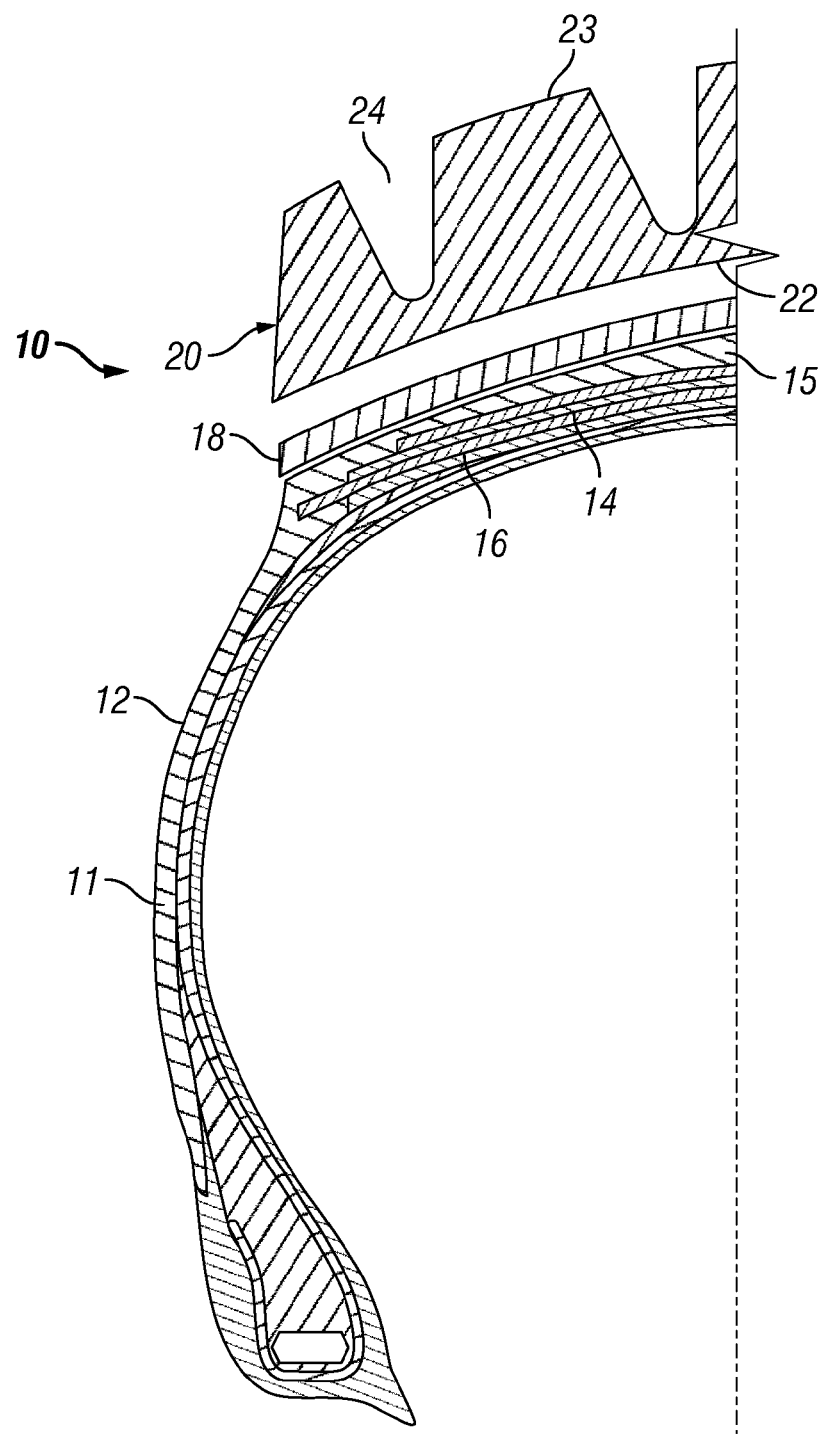
FIG. 1 is a partial cross-sectional partially exploded view of an exemplary retread tire of the prior art.

FIG. 1 is a partial cross-sectional partially exploded view of an exemplary retread tire of the prior art. The retread tire 10 is shown comprising a tire carcass 12 having a crown section 14, a reinforcement package 16 and a sidewall 11. The retread tire further includes a cushion gum layer 18 and a precured tread band 20. The cushion gum layer 18 is an example of the material that may be used to bond the tread band 20 to the crown section 14 area of the retread tire 10.

The precured tread band 20 includes a front face 23 that contacts the ground and provides traction. Tread grooves 24 have a top open to the front face 23 of the tread band. The tread band 20 further includes the back face 22 that is bonded to the crown section 14 of the tire 10 by the cushion gum layer 18.

Figure 2:
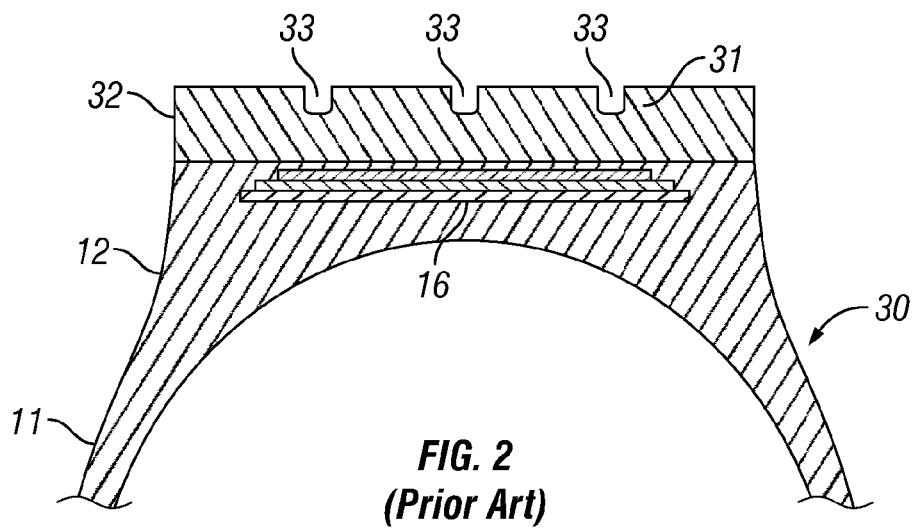
FIG. 2 is a partial cross-sectional view of an exemplary tire before it is retreaded.

FIG. 2 is a partial cross-sectional view of an exemplary tire before it is retreaded. Such tire may be a previously recapped tire that is ready for recapping again or it may be a tire that has never been recapped before. A tire 30 that is ready for the retreading process has a worn grooved tread area 31 that includes the worn grooves 33. The tire 30 further includes the undertread portion 32 that is positioned vertically between the top portion of the tread, which ends at the bottoms of the grooves 33, and the belts or reinforcement package 16 of the tire. As used herein, the vertical direction is perpendicular to the ground contacting surface of the tire tread. The undertread portion 32 provides a cushion and/or protective layer between the ground contacting tread and the belt package 16 in the tire carcass 12, thereby ensuring that the belt package 16 is not exposed through the wearing of the tire tread 31. During the retreading process typically performed in the prior art, the entire worn grooved tread area 31 and most of the undertread 32 is removed by a buffer or other grinding or cutting device or process as known to one having ordinary skill in the art of tire retreading. The undertread portion 32 is typically removed to such an extent that only a thin layer of rubber remains, e.g., between about 1 and about 3 mm, in the area 15 above the reinforcement package 16, as shown in FIG. 1. The material that is removed from the tire 30 to be retreaded creates waste that is discarded and then replaced with new material that is part of the tread band 20 bonded to the tire carcass 12 during the subsequent retread process. Much of this material that is removed and replaced repeatedly at each recap is never involved in the wear process.

Unlike these precured tread bands of the prior art, the tread bands disclosed herein may be typically thinner and/or less massive for a given useable tread depth because the need to replace the undertread, which the prior art processes buffed away, is reduced. Particular embodiments of the present invention remove less of the old tread and/or undertread during the retreading process thereby allowing this remaining material to be used and not replaced in the newly retreaded tire. Indeed, in some embodiments, as much as possible of the groove of the old tire tread should remain, as well as the undertread, when the new precured tread band is bonded to the tire.

The precured tread bands disclosed herein have a back face bonded to the retread tire during the retreading process. The back face is bonded to a prepared bonding surface of the base portion of the tire being retreaded. The precured tread bands further include a tread groove having a groove bottom portion that extends below the back face of the tread band. The groove bottom portion extending below the back face of the tread band is embedded in a base groove that is formed in the base portion of tire being retreaded. The base groove of the base portion of the tire being retreaded is thus open to the prepared bonding surface of the tire.

To reduce the amount of rubber utilized in the tread band and to reduce the waste rubber generated in preparing the bonding surfaces of the tires being retreaded, the tread groove bottom portion is embedded within the base groove. This requires the tread groove bottom portion to extend lower than the back face of the tread band that is bonded to the prepared bonding surface, thereby reducing the waste rubber generated, reducing the amount of rubber utilized in the tread band and increasing the use of the old tread and/or undertread of the tire being retreaded.

As will be further explained below, particular embodiments of the present invention include a tread groove of the tread band having a tread groove top that is open to the ground contacting front face of the tread band and a tread groove bottom portion that is embedded in the base groove. Other embodiments have a primary and a secondary groove. In such embodiments, the primary groove has a top that is open to the ground contacting front face of the tread band. The secondary groove has a top that is initially closed to the ground contacting front face of the tread band, the top being higher than the groove bottom of the primary groove so that the secondary groove top is opened to the ground contacting front face of the tread band prior to disappearance by wear of the primary groove. (While it is known to vent or otherwise provide a small opening between the top of the secondary groove and the front face of the tread band, such secondary grooves are still considered herein to be closed to the ground contacting front face of the tread band until the secondary groove itself is opened to the front face through wear, not just a vent.) Higher as used herein means closer to the ground contacting surface of the tread in the vertical direction. The secondary groove further includes a secondary groove bottom portion that is embedded in the base groove.

Figure 3:
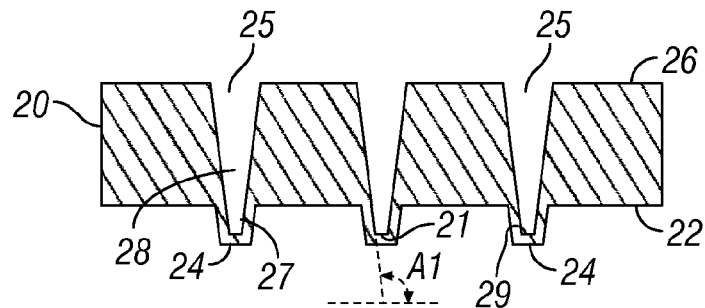
FIG. 3 is a cross-sectional view of an exemplary embodiment of a tread band having tread groove bottom portion that extends below the bonding surface of the tread band.
Figure 4:
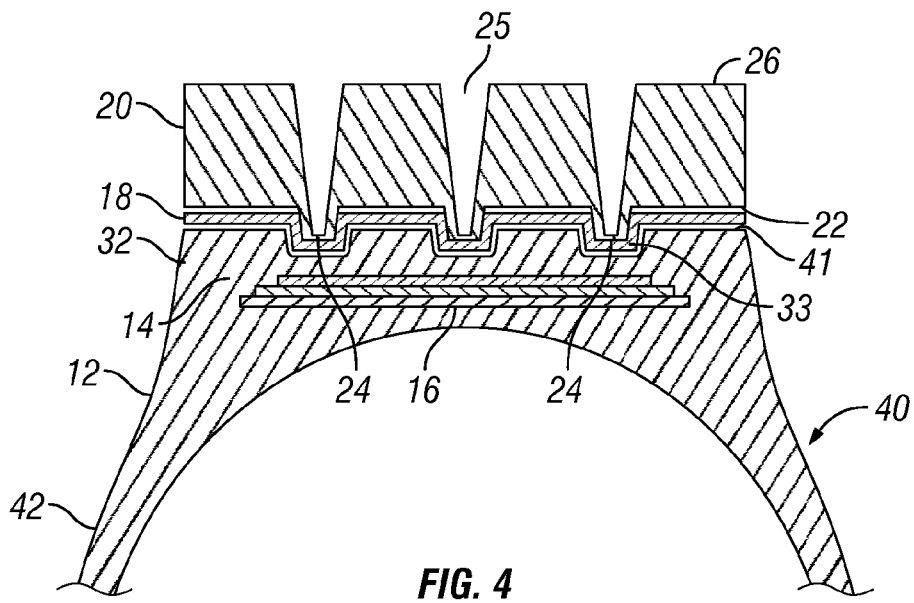
FIG. 4 is a partial cross-sectional partially exploded view of an exemplary embodiment of a retreaded tire having a tread groove bottom portion of the tread band embedded within the base grooves of a base tire.

FIG. 3 is a cross-sectional view of an exemplary embodiment of a tread band having a tread groove bottom portion that extends below the bonding surface of the tread band. FIG. 4 is a partial cross-sectional partially exploded view of an exemplary embodiment of a retreaded tire having a tread groove bottom portion of the tread band embedded within the base groove of a base tire. Referring to FIGS. 3 and 4, an example of a retread tire 40 includes the base portion 42 of the tire 40 and the tread band 20 that is bonded to the base portion 42 with a cushion gum layer 18. The base portion 42 of the tire includes the tire carcass 12 having a reinforcement package 16 in the crown section 14. The crown section 14 has been buffed or otherwise worked to provide a prepared bonding surface 41 to which the tread band 20 can be bonded with the cushion gum 18.

The tread band 20 includes a front face 26 and a tread groove 25 that opens to the front face 26 of the tread band 20. The tread band 20 further includes a groove bottom portion 24 that extends below the back face 22 of the tread band 20. It should be noted that the tread groove bottom portion 24 of the tread groove 25 includes the side wall 27 and the floor 21 of the groove bottom portion 24 extending below the back face 22 of the tread band 20. The void portion 28 of the tread groove 25 may, in those embodiments wherein the void portion 28 extends into the groove bottom portion 24, also extend below the back face 22 of the tread band 20. It should be noted that as used herein, the groove void bottom 29 is the lowest point (furthest from the front face 26 of the tread band 20) of the groove void portion 28.

Unlike the buffing processes of the prior art, only enough of the worn grooved tread area 31 and/or undertread 32 is removed to provide an adequate bonding surface for the tread band 20. An adequate bonding surface is provided by removing and/or filling any uneven portions of the worn grooved tread area 31 and/or undertread 32 caused, for example, by uneven wear, cracks and/or chunks of tread that have been gouged or cut from the tire through its daily use. In this exemplary embodiment, the grooves 33 of the original tire were not entirely buffed away and none of the undertread portion 32 of the original tire was buffed away. The tread band 20 is then aligned onto the prepared bonding surface 41 of the tire carcass 12 so that the tread groove bottom portion 24 of the tread groove 25 aligns with and is embedded within the base groove 33 that was not buffed away or was otherwise provided. The back face 22 of the tread band 20 is bonded to the prepared bonding surface 41 of the base portion 42 of the tire 40.

In the exemplary embodiment shown in FIG. 3, the void portion 28 of the tread groove 25 extends below the back face 22 of the tread band 20 as does the wall 27 of the groove bottom portion 24. In other embodiments, the void portion 28 of the tread groove 25 may not extend beyond the back face 22 of the tread band 20 but in those embodiments, the wall 27 of the groove bottom portion 24 of the tread groove 25 extends beyond the back face 22 of the tread band 20.

It should be noted that even though the grooves 33 shown in the attached figures are arranged laterally across the ground contacting face of the tire and may appear to be continuous circumferentially around the tire, the invention is not so limited to such a groove. Indeed such a groove may run laterally across the tire or in any other suitable direction. Such a groove may be an "original" groove, a groove formed in the tire to be retreaded and not removed during the formation of the prepared bonding surface or such a groove may be formed in the surface by any suitable method or operation, including tire wear (which may result in exposure of an underlying groove), as known to one having ordinary skill in the art.

The base groove formed in the base portion of the tire may be formed in any way suitable that allows for the alignment of the base groove with the bottom portion of the precured tread band tread groove so that the tread groove bottom portion is embedded within the base groove. As in the embodiment illustrated in FIG. 4, the base groove may be simply a groove, part of which was the original tread groove of the tire being retreaded. As long as the bonding surface preparation adequately removes and/or repairs (using, for example, any appropriate materials and methods) any gouges, cuts, cracks and/or other surface damage occurring in the original tread to provide a suitable prepared bonding surface for the tread band, it is advantageous to keep as much of the old tread as possible.

Optionally, the original groove may be further cut using, for example, a grinding tool or other cutting process as known to one having ordinary skill in the art. The grinding tool may be used to deepen and/or widen the original groove and thus provide a deeper and/or wider groove that will provide additional useable tread life for the retreaded tire. Typically this groove forming process may be suitable as long as there still remains sufficient protective undertread (typically, for example, between 1 and 4 mm) between the bottom of the grooves and the reinforcement package.

Alternatively an additional groove may be formed in the tread adjacent to the original groove of the tire using a grinding tool or other suitable cutting tool. This newly formed groove may then be aligned with the tread groove of the tread band so that a bottom portion of the tread groove can be embedded within the formed base groove. Optionally the original groove and the newly formed groove may each be aligned with the bottom portion of tread grooves of the tread band.

In particular embodiments of the present invention, the base groove may be formed (using, for example, a grinding tool or other cutting tool) in the undertread portion of the tire being retreaded. If the gouges, cracks or and/or cuts are of such depth or if the wear of the tire being retreaded was such that the entire grooved tread portion had to be buffed off, it is still advantageous to leave as much of the undertread as possible during the buffing step so that the undertread can be grooved to provide a base groove and contribute to the useful life of the retreaded tire.

In other embodiments, the base groove may be formed in the base portion of a tire that has already been retreaded. In such embodiments, the base groove may be a groove formed in the tread band that was bonded to the tire in the earlier retread process. Alternatively, the grooved tread area of such a tread band could be buffed away, leaving only the undertread portion of the tread band. In that case, the undertread portion of the tread band could be cut to provide a base groove therein using, for example, a grinding tool or other cutting tool.

Advantageously, in particular embodiments of the present invention, the new tread groove of the tread band provides a means for refurbishing the groove void bottoms of the tread of the tire being retreaded. Groove void bottoms of tires being retreaded may include special features molded therein as known to one having ordinary skill in the art. Such features may include, for example, stone ejectors and wear indicators. The new tread groove void bottom, embedded within the old groove, may effectively provide a refurbished groove bottom for the retreaded tire. Thus, for example, if the old tire is regrooved, thereby removing the stone ejectors originally molded into the groove, the retread tread band may provide a groove void bottom having such molded feature therein, the groove void bottom being embedded into the regrooved base groove.

Since the tread groove bottom portion that extends below the back face of the tread band must be aligned with and embedded within the base groove, it may be advantageous in some embodiments to cut the base groove (for example, with a grinding operation) so that it is wider at the opening than at the bottom of the base groove. In some embodiments, the sides of the base groove may form an angle A1 (See, for example, FIG. 3) with the back face of the tread band. For example, such an angle A1 may range between 85 degrees and 135 degrees.

Optionally, the floor 21 of the tread groove bottom portion 24 of the tread band 20 may be cut out either before or after the tread band is bonded to the prepared bonding surface. In such embodiments, the tread groove 25 is in fluid communication with the base groove 33. For example, if the base groove 33 is significantly deeper than the tread groove bottom portion 24, the floor 21 of the tread groove bottom portion 24 may be removed (using a grinding tool or other cutting tool) to provide a deeper groove on the retreaded tire.

Figure 5:
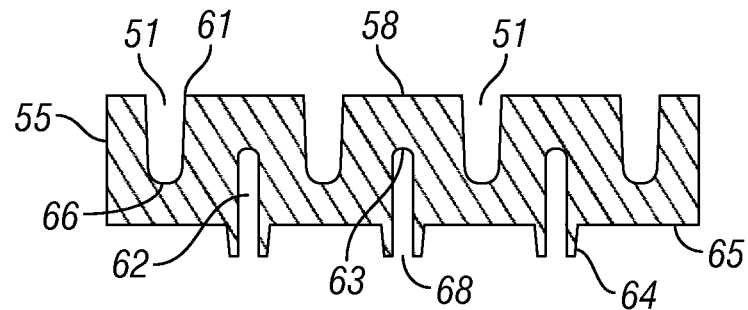
FIG. 5 is a cross-sectional view of an exemplary embodiment of a precured tread band having a secondary tread groove bottom portion that extends below the bonding surface of the tread band and a primary tread groove having a top open to the ground contacting top face of the tread band.
Figure 6:
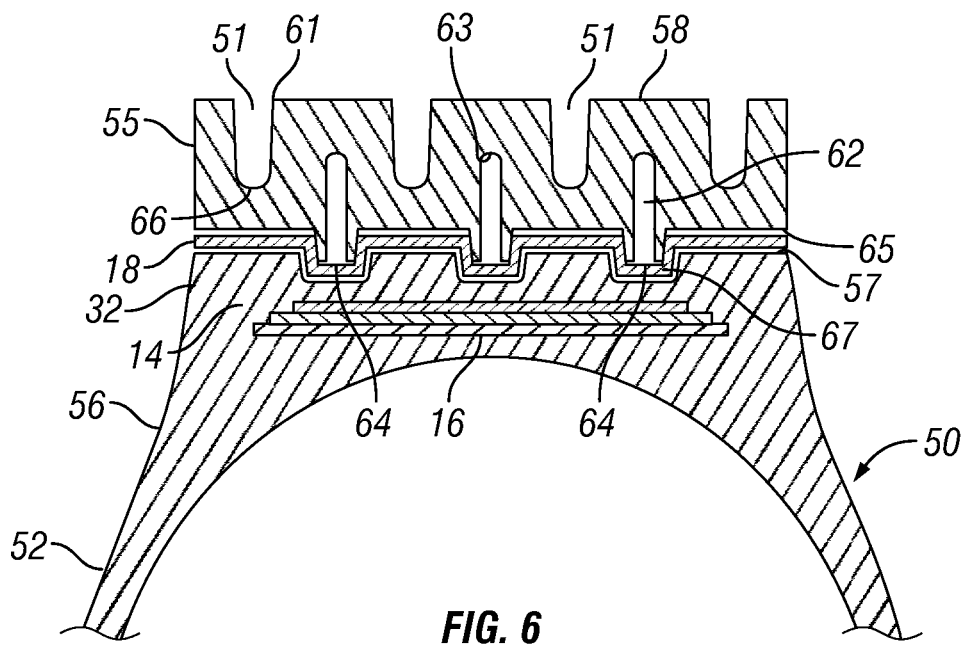
FIG. 6 is a partial cross-sectional partially exploded view of an exemplary embodiment of a retreaded tire having the tread band shown in FIG. 5.

FIG. 5 is a cross-sectional view of an exemplary embodiment of a precured tread band having a secondary tread groove bottom that extends below the back face of the tread band and a primary tread groove having a top open to the ground contacting top face of the tread band. FIG. 6 is a partial cross-sectional partially exploded view of an exemplary embodiment of a retreaded tire having the tread band shown in FIG. 5. Referring to FIGS. 5 and 6, an example of a retread tire 50 includes the base portion 52 of the tire 50 and the precured tread band 55 that is bonded to the base portion 52 with a cushion gum layer 18. The base portion 52 of the tire includes the tire carcass 56 having a reinforcement package 16 in the crown section 14, the crown section 14 having been buffed or otherwise worked to provide a prepared bonding surface 57 to which the precured tread band 55 can be bonded with the cushion gum 18.

The precured tread band 55 has a primary groove 51 having a top 61 open to the ground contacting front face 58 of the tread band 55 and further has a secondary groove 62 having a top 63 closed to the ground contacting front face 58 of the tread band 55 and a groove bottom portion 64 that extends below the back face 65 of the tread band 55. The back face 65 of the tread band 55 is bonded to the prepared bonding surface 57 of the retread tire 50 during the retreading process. The groove top 63 of the secondary groove 62 is higher than a groove bottom 66 of the primary groove 51 so that the secondary groove 62 is exposed to the ground contacting front face 58 prior to the disappearance by wear of the primary groove 51. (While it is known to vent or otherwise provide a small opening between the top of the secondary groove and the front face of the tread band, such secondary grooves are still considered herein to be closed to the ground contacting front face of the tread band until the secondary groove itself is opened to the front face through wear, not just through a vent.)

The tread band 55 is aligned onto the prepared bonding surface 57 of the base portion 52 of the tire so that the groove bottom portion 64 of the secondary tread groove 62 aligns with and is embedded within the base groove 67 that was not buffed away or was otherwise provided. The back face 65 of the tread band 55 is bonded to the prepared bonding surface 57 of the base portion 52 of the tire 50.

Particular embodiments of the present invention further include methods for retreading a tire. Such methods include providing the prepared bonding surface of the base portion of the tire in such a manner as to provide the base groove that is open to the prepared bonding surface.

The prepared bonding surface may be an original grooved tread portion of the tire being retreaded, an original undertread portion of the tire being retreaded or a grooved tread portion or undertread portion of a previously bonded tread band applied during an earlier retread operation on the tire to be retreaded. If the tire was previously retreaded, the undertread portion may include the cushion gum applied during the previous retreading process and bonded to the remaining section of tread band.

If the original grooved tread portion of the tire being retreaded is used as the prepared bonding surface or if a grooved tread portion of a previously bonded tread band is used as the prepared bonding surface, then the base portion of the tire includes a base tread groove that was not removed during the preparation of the bonding surface. In such embodiments, the base tread groove is a tread groove remaining (not buffed away) from the grooved tread area of the tire to be retreaded.

In such embodiments the step of providing a prepared bonding surface may include removing circumferentially around the tire a determined depth of a grooved tread portion of the base portion of the tire, the grooved tread portion having a base tread groove formed therein, thereby providing the prepared bonding surface. In these embodiments that provide the prepared bonding surface from a grooved tread portion of an original tread or from an old tread band of a previous retreading, the determined depth is less than the depth to the bottom of the base tread groove. Indeed the base tread groove is the base groove into which the tread groove bottom portion is embedded.

It should be noted that the determined depth in such embodiments should be at least the depth to which the material must be removed to eliminate any irreparable gouges, cuts, cracks and/or other surface damage occurring in the original tread (or old retread) caused, for example, by running over road hazards or debris or by irregular wear. If such surface damage can be repaired using appropriate material and methods as known in the art, then the determined depth may be only the depth necessary to remove any unrepaired surface damage. The determined depth may include, for example, no material or very little material of the original tread in those embodiments having little or no damage to the original tread from gouges, cuts cracks and so forth or where the damage has been repaired using appropriate material and methods. However, as noted, since the tread groove bottom portion of the tread band is to be embedded within the base groove, the tread cannot be buffed to the bottom of the tread groove formed therein. As one having ordinary skill in the art would appreciate, the determined amount to be buffed or otherwise removed may be determined before the buffing begins or as the buffing progresses. In either case, the determined amount is that amount resulting in a suitable prepared bonding surface.

Optionally the method may further include regrooving the base tread to make the tread deeper and/or wider, i.e., the bottom of the base groove is formed deeper and thereby closer to the reinforcement package of the tire and/or the base groove is formed wider. Such step may be achieved, for example, with a grinding or other cutting operation as known to one having ordinary skill in the art.

If the original undertread portion of the tire being retreaded is used as the prepared bonding surface or if an undertread portion of a previously bonded tread band is used as the prepared bonding surface, then the step of providing a prepared bonding surface includes removing circumferentially around the tire a determined depth of a grooved tread portion of the base portion of the tire, the grooved tread portion having a base tread groove formed therein, thereby providing the prepared bonding surface, wherein the determined depth is at least to a bottom of the base tread groove. Such embodiments further include the step of forming the base groove into the prepared bonding surface.

In these embodiments, the determined depth is at least to a depth that includes the bottom of the tread groove, which thereby totally removes the original grooved tread area. As before, the determined depth should be at least the depth to which the material must be removed to eliminate any unrepairable gouges, cuts, cracks and/or other surface damage occurring in the original tread caused, for example, by running over road hazards or debris or by irregular wear. If such surface damage can be repaired using appropriate material and methods as known in the art, then the determined depth may be at least the depth necessary to remove any unrepaired surface damage (though still at least to the bottom of the tread groove). As one having ordinary skill in the art would appreciate, the determined amount to be buffed or otherwise removed may be determined before the buffing begins or as the buffing progresses. In either case, the determined amount is that amount resulting in a suitable prepared bonding surface.

Particular embodiments that include forming the base groove in the undertread may include the step of forming the base groove into the prepared bonding surface. A new groove may be formed into the exposed undertread to provide the base groove in which the tread bottom portion of the tread band will be embedded. Such step may be achieved, for example, through the use of a grinding or cutting operation known to one having ordinary skill in the art.

Other embodiments may include aligning the tread groove bottom portion with the base groove and embedding the tread groove bottom portion of the tread groove within the base groove.

Methods for retreading a tire may further include the step of bonding the precured tread band in its aligned position to the prepared bonding surface. The bonding may be made by any method known to one having ordinary skill in the art, including the use of a cushion gum layer. The cushion gum is typically a green (uncured) rubber compound. Other materials include, for example, polyurethane or other adhesives. Bonding materials may be sprayed, painted, spread and/or extruded onto the tread band back face, the prepared bonding surface or combinations thereof. Alternatively, either alone or in combination with other bonding materials, a sheet of bonding material may be placed onto one or both of the bonding surfaces. All of these bonding materials and methods of applying are known to one having ordinary skill in the art.

In particular embodiments the cushion gum may be sprayed onto one or both of the bonding surfaces to provide a very thin layer of cushion gum, e.g., between 200 and 600 microns on average or less than 300 microns on average. Such methods are well known, one example being provided in U.S. Pat. No. 7,128,794, which patent is hereby fully incorporated herein by reference for all it discloses.

In particular embodiments it has been noted that the floor 21 of the groove bottom portion 24 of the tread groove may be open to the base groove so that the tread band groove 25 is in fluid communication with the base groove 33. Therefore particular method embodiments may furthering include removing the floor of the tread groove bottom portion so that the tread groove bottom portion opens into and is embedded within the base groove. Such step may be performed before the tread band is applied to the base portion of after the tread band has been applied to the base portion.

To help maintain the groove bottom portion being embedded within the base groove during the curing process, it may be useful in some embodiments to provide a band inserted into the tread band groove. Such a band, such as an elastic band, stretched into place can exert a force on the floor of the groove bottom portion during the cure to help keep the bottom portion embedded within the base groove during cure.

These methods may be applied to any type of tire and as such, any type of tire may provide an embodiment of the present invention. However, particular embodiments are especially beneficial for heavy vehicle tires such as for buses and trucks. More specifically embodiments may include truck tires that are steer tires, drive tires or trailer tires. It is contemplated that trailer tires may be particularly suitable for such retread processes.

Particular embodiments may further include the steps of providing a precured tread band comprising a back face and a tread groove bottom portion that extends below the back face, aligning the tread groove bottom of the tread groove with the base groove and embedding the tread groove bottom portion of the tread groove within the base groove.

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A retreaded tire, comprising:
   a precured tread band bonded to a prepared bonding surface of a base portion of the tire, the precured tread band comprising a back face bonded to the prepared bonding surface of the base portion of the tire and a tread groove extending within a thickness of the precured tread band and into a tread groove bottom portion that extends below the back face of the tread band, such that the tread groove extends outwardly from the back face;
   a base groove formed in the base portion of the tire and open to the prepared bonding surface of the tire, wherein the tread groove bottom portion of the tread band is aligned with and embedded within the base groove, the base portion of the tire defining the base groove includes tread material configured for use during a worn life of the retreaded tire;
   wherein the tread groove is a secondary groove, the precured tread band further comprising a primary groove having a top open to a ground contacting front face of the tread band, wherein a top of the secondary groove is closed to the ground contacting front face of the tread band and is higher than a groove bottom of the primary groove so that the secondary groove top is opened to the ground contacting front face of the tread band prior to disappearance by wear of the primary groove.

2. The retreaded tire of claim 1, wherein a top of the tread groove is open to a ground contacting front face of the tread band.

3. The retreaded tire of claim 1, wherein the tread groove bottom portion includes a tread groove void bottom, wherein a feature is molded into the tread groove void bottom.

4. The retreaded tire of claim 3, wherein the feature is one of a stone ejector and a wear indicator.

5. The retreaded tire of claim 1, wherein the base portion of the tire comprises a grooved tread portion having the base groove formed therein and wherein the prepared bonding surface is a front face of the grooved tread portion having the base groove formed therein.

6. The retreaded tire of claim 1, wherein the base portion of the tire comprises an undertread portion and wherein the prepared bonding surface is a front face of the undertread portion, the undertread portion having the base groove formed therein and open thereto.

7. The retreaded tire of claim 1, wherein the prepared bonding surface is a front face of a worn tread band previously applied to the base portion of the tire, the base groove open to the front face of the worn tread band.

8. The retreaded tire of claim 7, wherein the prepared bonding surface is an undertread portion of the worn tread band.

9. The retreaded tire of claim 1, wherein the tread groove bottom portion is open along its length to the base groove so that the base groove is in fluid communication with the tread groove.

10. The retreaded tire of claim 1, where the tread groove is a longitudinal groove.

11. The retreaded tire of claim 10, where the longitudinal groove is a circumferential groove.

12. A method for retreading a tire, the method comprising:
providing a prepared bonding surface of a base portion of the tire, the prepared bonding surface having a base groove formed in the base portion of the tire and open to the prepared bonding surface, the base portion of the tire defining the base groove including tread material configured for use during a worn life of the retreaded tire;
providing a precured tread band comprising a back face and a tread groove extending within a thickness of the precured tread band and into a tread groove bottom portion that extends below the back face, such that the tread groove extends outwardly from the back face;
aligning the tread groove bottom portion of the tread band with the base groove;
embedding the tread groove bottom portion of the tread groove within the base groove; and
removing a bottom of the tread groove bottom portion so that the tread groove is in fluid communication with the base groove.

13. The method of claim 12, further comprising:
bonding the back face of the precured tread band to the prepared bonding surface.

14. The method of claim 12, wherein the step of providing a prepared bonding surface comprises
at least one of:
removing circumferentially around the tire a determined depth of a grooved tread portion of the base portion of the tire, the grooved tread portion having a base tread groove formed therein, wherein the determined depth is less than a depth to a bottom of the base tread groove and wherein the base tread groove is the base groove open to the prepared bonding surface:
deepening the base groove; and,
widening the base groove.

15. The method of claim 12, wherein the step of providing a prepared bonding surface comprises:
removing circumferentially around the tire a determined depth of a tread portion of the base portion of the tire, the tread portion having a base tread groove formed therein, wherein the determined depth is at least to a bottom of the base tread groove; and,
forming the base groove into the prepared bonding surface.

* * * * *